United States Patent [19]
Dieterich

[11] 4,455,635
[45] Jun. 19, 1984

[54] CODING SYSTEM FOR RECORDED DIGITAL AUDIO

[75] Inventor: Charles B. Dieterich, Princeton, N.J.

[73] Assignee: RCA Corporation, New York, N.Y.

[21] Appl. No.: 533,047

[22] Filed: Sep. 19, 1983

Related U.S. Application Data

[63] Continuation of Ser. No. 311,259, Oct. 14, 1981, abandoned.

[51] Int. Cl.³ .................... G11B 7/00; G11B 27/00
[52] U.S. Cl. ........................... 369/59; 358/336; 360/32; 360/38.1; 371/39; 371/40; 371/45
[58] Field of Search ............... 358/310, 314, 327, 335, 358/336, 339; 360/32, 36.2, 38.1, 37.1, 39, 48; 369/59; 371/40, 43, 45, 38, 39

[56] References Cited

U.S. PATENT DOCUMENTS

| | | | |
|---|---|---|---|
| 3,789,137 | 1/1974 | Newell | 178/6.6 |
| 4,138,694 | 2/1979 | Doi et al. | 358/127 |
| 4,145,683 | 3/1979 | Brookhart | 340/146.1 |
| 4,146,099 | 3/1979 | Matsushima et al. | 358/336 X |
| 4,281,355 | 7/1981 | Wadu et al. | 360/32 |
| 4,296,491 | 10/1981 | Jerome | 369/59 |
| 4,308,557 | 12/1981 | Dieterich | 358/128.5 |

OTHER PUBLICATIONS

"A Digital Audio System Based on a PCM STD. Format", Kosaka et al., AES Reprint #1520, 64th Convention, 11/79.

"A PCM Digital Audio Processor for Home Use VTR's", Ishida et al., AES Reprint #1528, 64th Convention, 11/79.

"Coding Against Fading or Interference which can be Blanked", Cyclotomics, Inc., 1979.

Funkschau 1974, No. 26, pp. 1028-1030, W. Schulz, "Bild/Ton-Aufzeichnung Optisch-Digital".

Primary Examiner—Robert L. Richardson
Attorney, Agent, or Firm—E. M. Whitacre; P. J. Rasmussen; E. P. Herrmann

[57] ABSTRACT

A system for recording and recovering analog signal in digital format utilizes a substantially video field format without the vertical blanking intervals thereby eliminating the need to time compress the information on a field by field basis. The digital signal is encoded for error correction of burst errors at least one line in length. Auxiliary digital information is substituted for particular lines of encoded signal for purposes of identifying the position of the playback transducer. The recovered signal is decoded by an error correcting decoder which recognizes the auxiliary information as a signal burst error and reconstructs the signal that was substituted by the auxiliary information. The decoded signal is then converted to a time continuous analog signal.

12 Claims, 7 Drawing Figures

CODING SYSTEM FOR RECORDED DIGITAL AUDIO

This is a continuation of application Ser. No. 311,259 filed Oct. 14, 1981 now abandoned.

This invention relates to conversion of analog audio signals to the digital domain and encoding and formatting the digital signal manifestations for recording or transmission. More particularly it relates to a system in which periodic auxiliary control signals are included in the bit stream without the necessity for time compression and expansion of the audio signal.

BACKGROUND OF THE INVENTION

The advent of relatively inexpensive analog-to-digital (A/D) and digital-to-analog (D/A) converters and high density, high bandwidth recording media have made possible recording of high fidelity audio signals in digital format. An audio signal encoded into a digital signal can be recorded and processed without substantial loss of signal quality. That is, the signal may be encoded with error correction information so that the signal recovery system can recognize and correct errors in the recovered signal.

Recording and playback systems such as the video disc and video tape systems are readily adapted for recording and recovery of digital audio signals. Digital audio systems currently under development generally utilize these types of video systems, and, for purposes of time base correction of the signal recovered from the recording media, format the signal similar to a composite video signal. The encoded signal is grouped into sequential blocks separated by synchronization signals (similar to horizontal sync signals), the synchronization signals being utilized to monitor signal recovery speed and provide a means to adjust the record playback rate. In helical scan tape systems, signals similar to vertical blanking intervals are included to account for switching of the record/recovery tape head between signal tracks. Disc record systems on the other hand may have signal recorded on a single spiral convolution obviating track switching and the vertical blanking intervals. However, because of the extremely small dimensions of the signal track and signal recovery transducer, the transducer is susceptible of being ejected from the track by microdefects and/or particles in the track. Certain video disc systems provide track (convolution) identification numbers within the recorded information which are monitored to determine whether the transducer is properly tracking successive convolutions. If the transducer is anomalously translated a transducer steering mechanism returns it to the proper convolution.

Proper tracking of discs recorded with high quality digital audio is important because error correction for loss of signal from an entire convolution is impractical. Therefore track identification signals should be included in the recorded information to monitor the position of the pickup transducer. It is advantageous to divide each convolution into sectors and include track/convolution and sector identification to enable the recovery apparatus to quickly determine and correct anomalous pickup transducer positions.

Heretofore it was considered necessary to compress the digital audio signal manifestations to provide periodic intervals for the inclusion of track identification signal. This required inclusion of circuitry in the playback apparatus to subsequently remove the identification signal and expand the compressed audio signal into a time continuous signal. This generally requires a buffer memory having capacity to store the greater portion of the signal contained between successive identification numbers, significantly adding to the cost and complexity of the playback apparatus.

SUMMARY OF THE INVENTION

Nominally a digital audio recorder/playback system must provide for signal dropouts (errors) considerably in excess of one line, i.e., the period between successive synchronization signals if acceptable playback performance is to be achieved. The time required for inclusion of the track identification signal is of the order of one or two line periods. By proper choice of a burst error correction code, the segment of the audio signal occurring within the periods designated for track identification signals may be eliminated and substituted for by the identification signal. The playback error correcting decoder will treat the identification signal as a burst error and reconstruct the audio signal from the remaining encoded signal.

DETAILED DESCRIPTION

Figure 1:
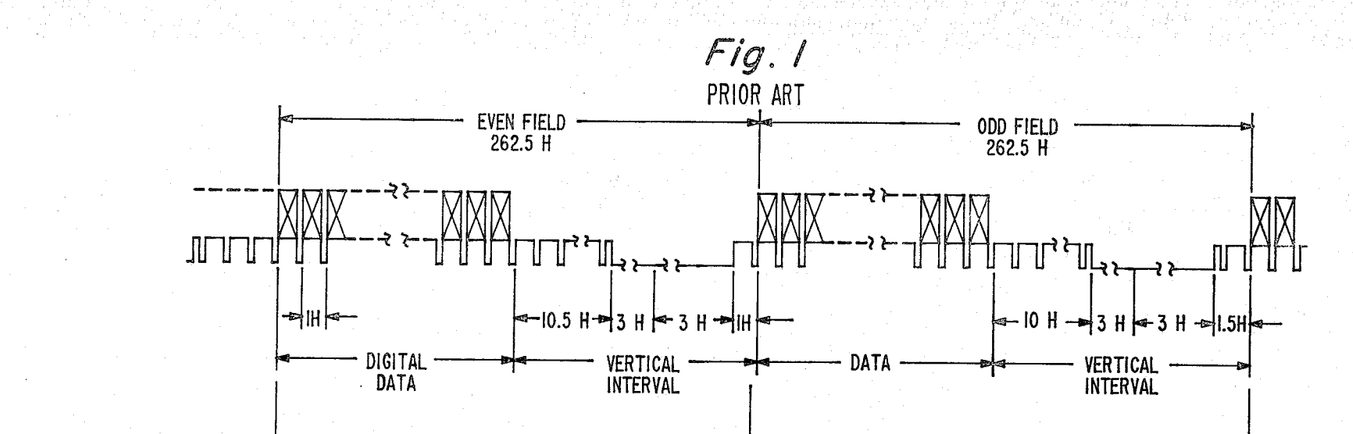
FIGS. 1, 2 and 3 are diagrammatic representation of a digitally encoded signal for recording in a high density recording system.

Referring to FIG. 1 the format of a digital audio signal recorded in a form compatible or similar to a composite video signal is illustrated. The signal comprises two large segments designated an odd field and an even field each divided into 262.5 smaller segments designated horizontal lines or H. Seventeen and one-half of the lines in each field comprise a vertical interval in which are included timing pulses for the purpose of synchronizing the playback system and/or providing a time period for periodically disabling a signal pickup transducer, e.g., for switching pickup heads in a tape recorder playback apparatus. See for example U.S. Pat. No. 4,138,694. Digital information is encoded in the remaining 245 lines. This information may include track identification information.

The signal recorded in the 245 DATA or information lines represents the digital manifestation of a time continuous signal. To provide a recovered signal that is time continuous, requires that signal which would normally occur during the vertical intervals be time compressed into the remaining 245 lines of each field. To reconstitute the compressed signal in a time continuous form requires buffer storage for either all or a large portion of the information in the 245 DATA lines. The information is read into the buffer at a rate consistent with signal recovery, then the information is read out at a slowed rate to expand the information in time to include the total field period. It should be appreciated that two such buffers are required—one to read in recovered signal while the other is reading out expanded signal and vice versa. If each of the 245 DATA lines contains 100 bits of signal information, approximately 50K bits of memory is required plus support circuitry to support the signal expansion.

Figure 2:
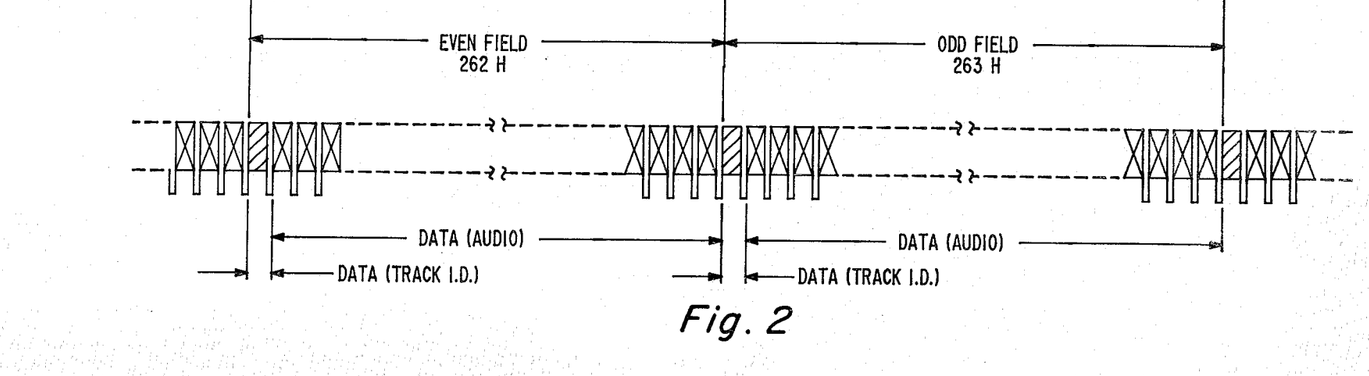

FIG. 2 illustrates a digital signal format which is also divided into fields. This signal format is compatible for recording and recovery in a disc playback system wherein the signal is recorded in a single spiral track. The periods corresponding to those allotted for the vertical interval in the FIG. 1 format have been arranged to contain recorded data. It can be seen that for like time continuous signal recorded in both FIG. 1 and FIG. 2 formats very little signal compression is required in the FIG. 2 format.

In FIG. 2, 261 lines of the total 262 in the even field and 262 lines of the 263 lines in the odd filed contain DATA (recorded signal information). The first line of each field is reserved for track identification (I.D.) information. If the track I.D. includes a recognition code for alerting the system that the particular line recovered is track I.D. information; the recognition code can serve the vertical synchronization function. A disc playback system describing a system including the use of a recognition code for framing, i.e., synchronizing the apparatus to the remainder of the field is described in U.S. Pat. No. 4,308,557 filed Oct. 12, 1979 and assigned to the same assignee as the present invention, which application is incorporated herein by reference.

Depending upon the type of signal errors which the recording media imposes on the recorded signal it may be advantageous to include a greater or lesser number of track I.D. and framing lines for a particular numbered DATA line. Nothing dictates that the FIG. 2 format correspond to the typical composite video field format of FIG. 1 for a dedicated digital signal disc recovery system. It is noted that it may be advantageous to utilize two consecutive lines per block of DATA lines for track I.D. information.

The present inventor reasoned that since (a) it would be necessary to encode the recorded digital information to afford error correction and (b) that the encoding should accommodate burst errors of multiple line lengths, it is not necessary to time compress the time continuous DATA to account for the signal periods allotted to track identification. Rather the DATA is recorded as generally uncompressed information (on a field basis) with the DATA corresponding to track I.D. periods simply ignored. When the signal is recovered the DATA signal processsling apparatus will recognize the track I.D. as a DATA burst error and correct for it by reconstructing the lost information from the remaining encoded signal. Thus the buffer memory required to expand a field of compressed signal is obviated.

Figure 3:
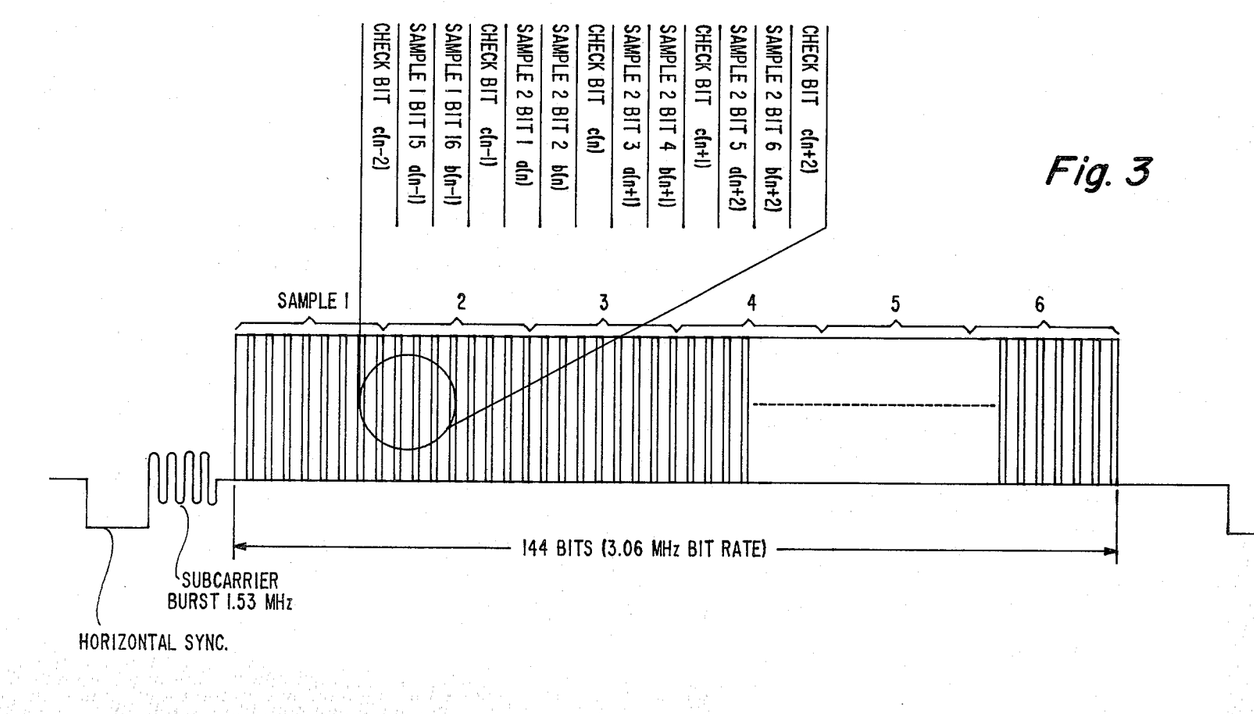

FIG. 3 exemplifies the detail of the recorded signal corresponding to one line of DATA information which may be utilized in either a FIG. 1 or FIG. 2 signal format. The particular DATA ERROR code illustrated, however, corresponds to that which would be provided by the FIG. 6 encoder. The code chosen results in relatively high signal overhead in that every third bit is an error check bit. The sequence of samples 1, 2, 3, 4, 5 and 6 correspond to left channel sample 1 (L1), right channel sample 1 (R1), L2, R2, L3, R3 respectively.

Each line includes a horizontal synchronization pulse, a burst of 1.53 MHz oscillations and signal information digitally encoded. The encoded signal for each line corresponds to a time continuous signal corresponding to a period which extends over the total line time. Thus on a line-to-line basis the encoded signal is time compressed to allow space for the horizontal sync and burst signals and ultimately must be expanded before user reception. However, the expansion may be accomplished in the timing of the D/A conversion because of the limited number of samples per line.

Figure 4:
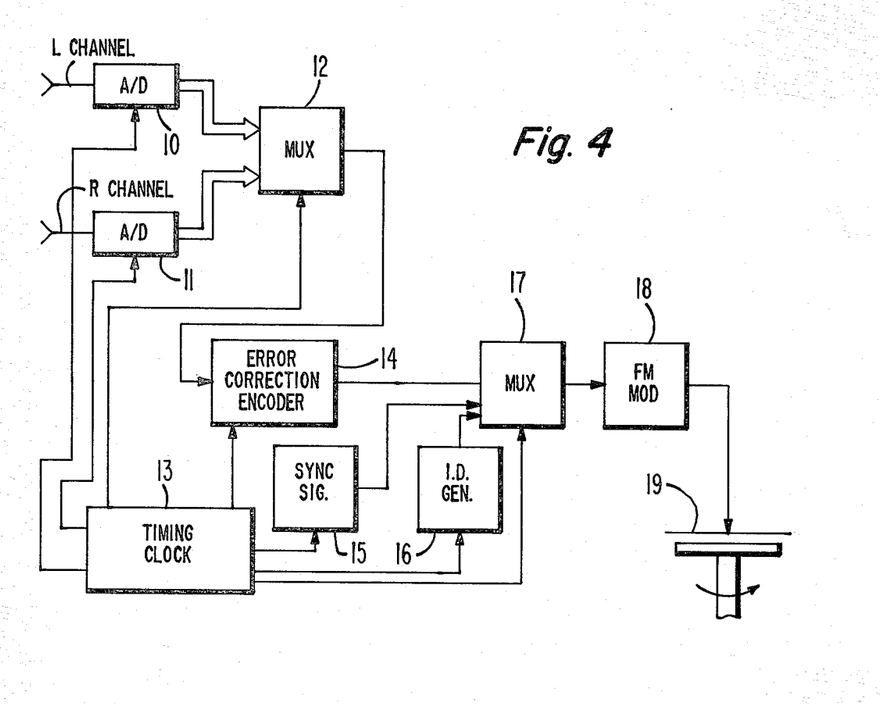
FIG. 4 is a block diagram of an analog-to-digital signal conversion and encoding apparatus.

FIG. 4 illustrates a digital encoder apparatus for composing a two channel audio signal in digital format with appropriate sync signals for recording on a disc record. In the figure, left and right channel analog audio signals are applied to the respective input terminals of A/D converters 10 and 11. Each of the A/D converters produces a 16 bit parallel output digital manifestation of the input signal sampled at regular intervals. The parallel 16 bit signals are successively time division multiplexed in circuit 12, i.e., to produce a signal of the form 16 bit serial sample L1, 16 bit serial sample R1, 16 bit serial sample L2, 16 bit serial sample R2, etc. The multiplexor 12 may consist of a two 16 bit parallel input-serial output shift registers, having their serial output terminals ORed together. One register receives parallel inputs from A/D converter 10, the other from A/D converter 11. The two shift registers are alternately clocked to output the data in serial fashion at a rate commensurate to produce the requisite line time compression.

The multiplexed digital audio signal is applied to the error correction encoder which generates error check bits that are a function of the applied multiplexed signal. The generated error check bits are regularly interspersed with the serial digital audio signal for subsequent use by the decoder after signal recovery from the record disc. The timing of the A/D converters 10, 11, the multiplexor 12 and the encoder 14 is such that the encoder output data occurs in successive blocks separated by prescribed time periods.

Multiplexor 17 receives the encoded signal from encoder 14 and burst and horizontal sync signals from generator 15 and superposes the signals from circuits 14 and 15 producing a composite signal as illustrated in FIG. 3.

A track identification signal generator 16 generates numbers sequentially along with a recognition code. At prescribed line periods these track I.D. signals are substituted for the digital audio data signal normally to be located in those respective lines by the multiplexor 17. The output signal FM modulates a carrier which is then recorded on a disc 19.

A timing circuit 13, including a stable oscillator, generates clocking signals that synchronously control the operation of the various circuit elements.

Figure 5:
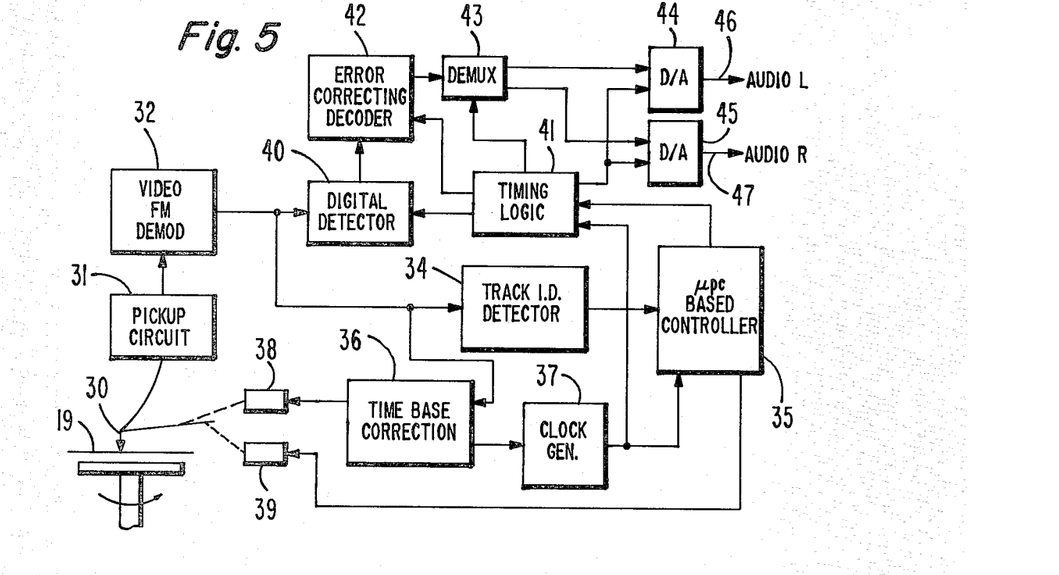
FIG. 5 is a block diagram of a digital audio record playback apparatus.

FIG. 5 is illustrative of a disc record playback apparatus for recovering the digitally encoded audio signals. A signal pickup transducer 30, cooperating with pickup circuitry 31, engages disc record 19 and detects the recorded signal when relative velocity is created between the transducer and the disc. The detected signal is applied to an FM demodulator 32 which converts it to the baseband signal of the FIG. 2 format. The demodulated signal is applied to the time base correction circuit 36 which compares the subcarrier burst frequency against a stable oscillator and produces a control signal responsive to the difference in frequencies. The control signal is applied to a velocity correction transducer coupled to the signal pickup transducer. The velocity correction transducer, or arm stretcher, moves the pickup transducer along the record track to maintain the desired relative stylus disc velocity.

The time base corrector also produces a clock frequency signal which is synchronous with the recorded data. This clock frequency signal is applied to a clock generator 37 which produces timing signals for respective system circuits.

The demodulated signal from circuit 32 is also applied to circuit 34 which recognizes the occurrence of a track identification signal. Circuit 34 then detects the signal and conditions it for use by the microprocessor control circuit 35. The microprocessor is programmed to recognize anomalous sequences of track I.D. numbers indicative of tracking errors, e.g., skips or locked grooves, etc. When a tracking error occurs a control signal is output to the signal pickup steering transducer 39 which in turn respositions the pickup transducer in the appropriate track (convolution).

The aforedescribed portion of the disc playback apparatus is similar to the RCA Corporation CED video disc player model SFT-100, which is commercially available.

The demodulated signal from circuit 32 is applied to detector circuit 40 which conditions the digital data for use by error decoder 42. Decoder 42 checks the recovered signal for errors and corrects signal errors within its capacity.

The output signal of the decoder is applied to a demultiplexor which separates the right channel signal samples from the left channel signal samples and applies the respective signals to D/A converters 45 and 44. The D/A converters produce two time continuous analog signals at output terminals 46 and 47. Note that time expansion of the line based compressed signal may be accomplished either by the rate at which the signals are applied to the demultiplexor output connection or at the rate the D/A converters are allowed to change output potential.

The operation of circuits 40, 42, 43, 44 and 45 are synchronized by control and clocking signals generated in the timing logic circuitry 41. Timing logic 41 is responsive to the clock generator 37 which develops the master clock. Since the clock generator 37 is synchronous to the recovered data, timing pulses produced by logic 41 will also be synchronous with the recovered data.

Timing logic 41 is also responsive to microprocessor control. The microprocessor 35, responsive to recognition of the track I.D. signal, controls the timing of detection of the digital data so that the decoder inputs information only during periods of a line interval when digital data is present.

Figure 6:
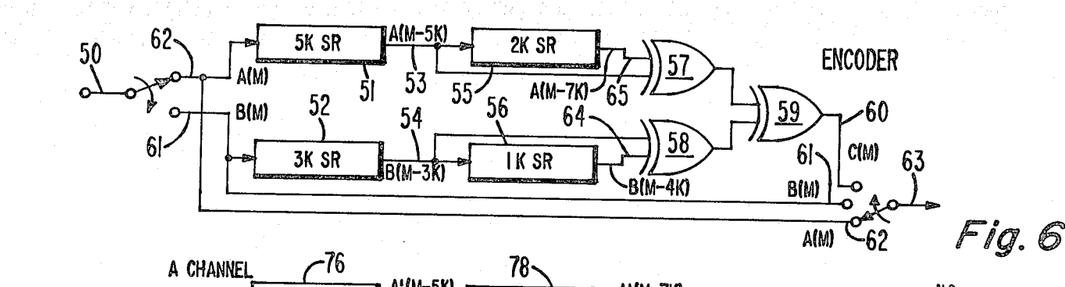
FIG. 6 is a block diagram of a particular error correction encoder that may be implemented in the FIG. 4 apparatus.

FIG. 6 illustrates a specific convolutional code signal encoder which may be implemented for the error correction encoder 14 of FIG. 4. This circuit is capable of encoding a digital signal for burst error correction of error bursts that are "K" successive bits long where "K" is an arbitrary whole number.

The encoder has input signal applied at terminal 50 and outputs an encoded signal at terminal 63. Consider the input signal to be a serial bit stream with alternate bits designated a(m) and b(m). The decoder output signal is a serial bit stream consisting of the input bit stream interspersed with error check bits C(m), i.e., if the input signal is the bit stream a(1), b(1), a(2), b(2), a(3), b(3), etc., the output signal will be of the form a(1), b(1), c(1), a(2), b(2), c(2), a(3), b(3), c(3), etc.

The error check bits are derived from the equation given by $$c(m) = b(M-3k) \oplus b(m-4K) \oplus a(M-5K) \oplus a(M-7K) \quad 1$$

where the symbol $\oplus$ indicates modulo 2 addition with the carry over dropped.

In the figure alternate successive bit positions occurring at input terminal 50 are commutated between two connections 61 and 62. Connection 61 serves the b(m) channel and connection 62 serves the a(m) channel. Successive a(m) information bits are input to a delay element 51 which delays the signal bits by 5 times "K" bit positions producing a delayed a(m−5K) signal at its output connection 53. This signal is applied to delay element 55 which delays the a(m) signal by an additional 2 times "K" bit times. The signal available at the output 65 of delay element 55 is described by a(m−7K).

The b(m) signal bits are similarly delayed in the b channel by delay elements 52 and 56. Delay elements 52 and 56 delay the signal 3 times "K" and 1 times "K" bit times, respectively producing the signals b(m−3K) and b(m−4K) at the output connections 54 and 64 of delay element 52 and 56 respectively.

Exclusive OR gate 57 connected to the delay element output connections 53 and 65 sums modulo 2 the signals a(m−5K) and a(m−7K). Exclusive OR gate 58 similary sums modulo 2 the signals b(m−3K) and b(m−4K). The results produced in gates 57 and 58 are summed modulo 2 in the Exclusive OR gate 59 to generate the signal c(m) on terminal 60. The error check bits c(m) can be seen to be delayed by 3, 4, 5 and 7 times "K" bit times from the real time signal. Therefore if a portion of the encoded signal a(m), b(m), c(m), a(m+1) etc. is lost or scrambled the error check bits for the particular a(m), b(m), bit positions are displaced in time therefrom and will be available to reconstruct the lost data.

The encoder output signal is produced at terminal 63 simply by commutating connection thereto between terminals 62, 61 and 60 in that order.

The delay elements 51, 52, 55 and 56 might typically be combinations of serial shift registers, e.g., of length 1024 bits. However, the function may equally well be implemented with random access memory devices.

Figure 7:
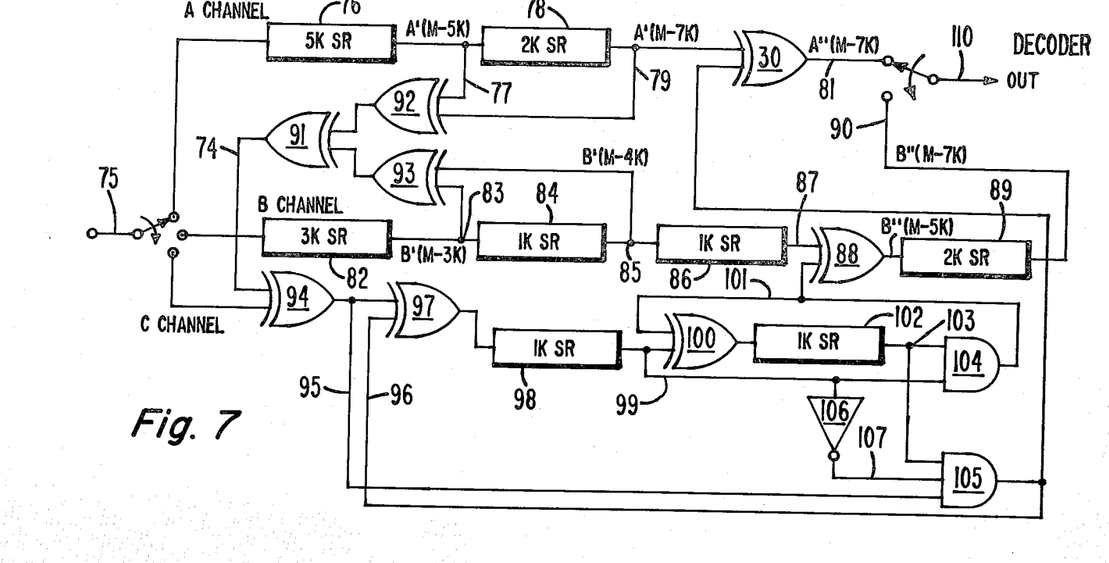
FIG. 7 is a block diagram of a particular error correction decoder that may be implemented in the FIG. 5 apparatus.

FIG. 7 is a specific decoder compatible for decoding encoded signal provided by the FIG. 6 circuitry, which decoder may be implemented for decoder 42 of FIG. 5. The decoder has an input terminal 75 and an output terminal 110. The required input signal is a serial bit stream of the format a(m), b(m), c(m), a(m+1), b(m+1) etc. The output signal is a serial bit stream delayed by 7 times "K" bit times and with the error check bits removed, i.e., the output signal is of the form a'(m−7K), b'(m−7K), a'(m+1−7K), b'(m+1−7K) ... etc.

In the decoder the input signal is commutated to direct the encoded a'(m), b'(m) and c'(m) signal bits respectively to a, b and c decoder signal channels. The primes on the bit designations indicate that the signal has been recovered from a transmission or recording media and may contain errors. The a(m) signal bits are applied to the serial connection of a 5 times "K" (76) and a 2 times "K" (78) delay element to produce the signal a'(m−5K) at connection 77 and the signal a'(m−7K) at connection 79. Similarly the b'(m) signal bits are applied to the serial connection of 3 times "K" delay element (82) and the 1 times "K" delay element (84) which produce the signals b'(m−3K) at connection 83 and the signal b'(m−4K) at connection 85. Exclusive OR gate 92 sums modulo 2 the signals a'(m−5) and a'(m−7K) available at connections 77 and 79. Exclusive OR gate 93 sums modulo 2 the signals b'(m−3K) and b'(m−4K) available at terminals 83 and 85 respectively. The output signals from exclusive OR gates 92 and 93 are summed modulo 2 in exclusive OR gate 91 producing a signal c'(m) at connection 74. The equation defining c'(m) is $$c'(m) = a'(m-5K) \oplus a'(m-7K) \oplus b'(m-3K) \oplus b'(m-4K)$$

If the recovered signal bits a'(m), b'(m) and c'(m) have been recovered error free, the check bit c'(m) generated by the decoder at connection 74 will equal the encoded check bit c(m). This condition is checked in the "c" signal bit channel of the decoder.

The transmitted or c(m) check bits and the decoder generated check bits c'(m) are applied to Exclusive OR gate 94, the output 95, of which goes high on the condition that its two input signals are logically different to indicate an error. The error is processed in circuit elements 97, 98, 100, 102, 104, 105 and 106 to determine if the error is in the received a'(m), b'(m) or c'(m) bit location. If the error is determined to be in the "a" channel the a'(m−7K) signal bit is summed modulo 2 in exclusive OR gate 30 with a bit correction signal developed on connection 96 to produce a corrected bit a"(m−7K) at terminal 81. Similarly if a bit in the "b" channel is determined to be in error, a correction bit developed at connection 101 is modulo 2 summed with a b'(m−5K) signal at connection 87 by exclusive OR gate 88 generating a corrected bit b"(m−5K). The output of exclusive OR gate 88 is applied to delay element 89 which delays the b"(m−5K) signal bits by an additional 2 times "K"bit times to translate the "b" channel signal to the proper time relationship with the a" channel signal, i.e., so that both an a'(m) and b'(m) bits undergo a 7 times "K" bit time delay.

Operation of the "c" decoder channel will be described with the aid of the following equations.

$$c'(m) = b'(m-3K) + b'(m-4K) + a'(m-5K) + a'(m-7K). \qquad 3$$

If the bit b'(O) is in error the equation for c'(m) will be in error after b'(O) is delayed by 3K bits and 4K bits. That is:

$$c(3K) = b'(O) \oplus b'(-K) \oplus a'(-2K) \oplus a'(-4K). \qquad 4$$

and $$c(4K) = b'(K) \oplus b'(O) \oplus a'(-K) \oplus a'(-3K). \qquad 5$$

The errors in c'(m) produced by an error at b'(O) occur at times separated by "K" bit times. On the other hand if an error occurs in bit a'(O) the resulting equations show:

$$c'(5K) = b'(2K) + b'(K) + a'(O) + a'(-2K) \qquad 6$$

and $$c'(7K) = b'(4K) + b'(3K) + a'(2K) + a'(O). \qquad 7$$

Two errors are produced in the signal c'(m) separated by 2 times "K" bit times. An error in the transmitted error check bit on the other hand occurs only once for that bit. From the foregoing it should be, and is possible to discriminate which bit is in error when the signals c(m) and c'(m) indicate a signal transmission/recovery error.

Referring again to FIG. 7, consider a "b" channel bit error at b'(O). When this bit arrives at connection 83, exclusive OR gate 94 outputs an error signal pulse onto connection 95 in accord with equation 3. Connection 96 is normally low so the error pulse is passed by exclusive OR gate 97 to the 1 times "K" bit delay element 98. As the bit in error, (b'(O)) progresses through the "b" channel 1 times "K" delay element 84, simultaneously the error pulse signal progresses through the 1 times "K" bit delay element 98. When the bit in error b'(O) advances to connection 85 the first error pulse has advanced to connection 99. Gate 94 produces a second error pulse in accord with equation 5. The bit in error b'(O) progresses through the 1 times "K" bit delay element 86. Simultaneously the first and second error pulses progress through the 1 times "K" bit delay elements 102 and 98 respectively. The bit in error b'(O) arrives at connection 87 and the first and second error pulse signals simultaneously arrive at connections 103 and 99 and are applied to AND gate 104 which produces an error correction bit at its output connection 101. This correction bit is added modulo 2 to the bit in error b'(O) by exclusive OR gate 88, changing the logical state of b'(O) and thereby correcting the error. The error correction bit, output by AND gate 104, is simultaneously added modulo 2 to the second error pulse by exclusive OR gate 100 connected between delay elements 98 and 102. This precludes the second error pulse from being ANDED with a subsequent error pulse occurring 1×"K" bit times later and producing an erroneous error correction pulse by gate 104. By a similar analysis, it can be shown that a bit error a'(O) will generate two error pulses in gate 94 separated by 2 times "K" bit times, and that AND gate 105 responsive to the error pulses separated by 2 times "K" bit times (i.e., by combined delay elements 98 and 102) will generate an error correction signal. This error correction signal is summed modulo 2 with the bit in error a'(O) by exclusive OR gate 30 to correct the error and is simultaneously added modulo 2 to the second error pulse by exclusive OR gate 97 so that the second error pulse cannot be ANDED with a subsequent error pulse to produce a false error correction bit.

AND gates 104 and 105 generate error correction bits only for successive error pulses occurring 1 and 2 times "K" bit times apart respectively. Delay elements 84 and 78 in channels "b" and "a" guarantee that bit errors b'(m) and a'(m) will produce error pulses at connection 95 separated by 1 and 2 times "K" bit times. Errors occurring in the check bits c'(m) on the other hand do not generate secondary errors that can produce error correction bits in AND gates 104 and 105 unless check bit errors coincidentally occur separated by 1 or 2 times "K" bit times. When this condition occurs an error is produced in the decoder output signal.

What is claimed is:

1. A system for recording analog signals in a digital manifestation thereof comprising:
means responsive to said digital manifestation of said analog signal for generating error correction code signals and multiplexing said error correction signals with said digital manifestation, the error correction signals being time delayed a predetermined interval relative to the digital manifestation of signal to which they correspond;

means for generating auxiliary digital signals for identifying blocks of error encoded digital manifestation of signal; and means for substituting said auxiliary digital signals for like periods of error encoded digital manifestation of signal.

2. Apparatus for recording digital manifestations of a time continuous analog signal comprising:
a source of digital signal;
means for time compressing the digital signal into successive sequences of prescribed duration;
error correction coding means responsive to the time compressed digital signal for encoding the digital signal with error check information, the error check information corresponding to a particular sequence being time division multiplexed with digital signal in one or more successive sequences;
means for generating synchronization signals;
means for generating auxiliary digital information;
a multiplexor responsive to the encoded digital signals, the synchronization signals and the auxiliary digital information for including said synchronization signals between the sequences of encoded digital signals and substituting the auxiliary digital information for prescribed sequences of said encoded digital signals.

3. The apparatus set forth in claim 2 wherein the error correction coding means comprises a convolutional code encoder, said encoder producing error check information sufficient to reconstruct the time compressed digital signal of a corresponding sequence.

4. The apparatus set forth in claim 3 wherein the encoder comprises:
an input and an output terminal;
first, second, third and fourth signal delaying means having respective input and output connections, the delay periods of said delaying means being of unequal duration;
means serially connecting the first and second signal delaying means;
means serially connecting the second and third signal delaying means;
means for commutating the connection of said input terminal between the input connections of the first and third signal delaying means synchronously with the bit rate of a digital signal applied to said input terminal;
a modulo two adder for summing signals occurring at the input and output connections of the second signal delaying means with the signals occurring at the input and output connections of the fourth signal delaying means; said summing means producing at an output connection thereof a least significant bit of the modulo two sum; and
means for commutating the connection between said output terminal and the input connection of the first signal delaying means, the input connection of the second signal delaying means and the output connection of the modulo two adder.

5. The apparatus set forth in claim 4 wherein the first, second, third and fourth delay elements produce signal delays of five, two, three and one units respectively and a unit is an arbitrary whole number greater than the number of digital signal bits in a signal sequence.

6. Apparatus for processing a digital manifestations of a time continuous analog signal, said signal being encoded with error correction signals delayed relative to said digital manifestation to which they correspond, said encoded signals including auxiliary digital identification signals for identifying intervals of said digital manifestation, said auxiliary signals being substituted for intervals of said encoded signal, said apparatus comprising:
means for detecting digital signal bits in the encoded signal;
an error detecting decoder responsive to the detected encoded digital signal for decoding the encoded signal, said decoder recognizing said auxiliary identification signals as a burst of signal errors and reconstructing the digital manifestation of the analog signal substituted therefore by said auxiliary identification signal; and
means for converting the decoded digital signal to a time continuous analog signal.

7. Apparatus for processing a recorded digital manifestation of a time continuous analog signal, said digital manifestation being time compressed into successive segments, said segments encoded with error correction code bits related to previous segments and having synchronization signals included between the segments, and wherein auxiliary digital information is substituted for prescribed ones of said segments, comprising:
means for recovering the recorded signal from the recording medium;
means responsive to the recovered signal for detecting said auxiliary digital information;
means responsive to the detected auxiliary digital information for generating control signals;
means responsive to said recovered signal for generating timing signals synchronous with the recovered digital information;
means responsive to the recovered signal, said timing signals, and said control signals for detecting the digital signals corresponding to the digital manifestation of said analog signal;
an error correcting decoder responsive to the detected digital signals and the error correction code bits included therein for correcting errors occurring in the digital signals, said decoder reconstructing digital signal segments having been substituted by auxiliary digital information; and
a digital-to-analog converter responsive to said timing signals for converting the error corrected digital signals to a time continuous analog signal.

8. The apparatus set forth in claim 7 wherein the decoder comprises a convolutional code decoder.

9. The apparatus set forth in claim 7 wherein the decoder comprises:
an input and an output terminal;
first, second, third and fourth signal delay elements of unequal length, said delay elements each having respective input and output connections, said first and second signal delay elements being in serial connection and said third and fourth delay elements being in serial connection;
a first modulo two ADDER having an output connection, and having respective input connections connected to the output connections of said first, second, third and fourth delay elements;
a second modulo two ADDER having a first input connected to the output connection of said first modulo two ADDER and having a second input connection;
means for commutating the connection between the input terminal and the first delay element input connection, the third delay element input connection and the second input connection of said second modulo two ADDER, a fifth delay element having delay equal to said fourth signal delay element, and having respective input and output connections;

third and fourth modulo two ADDERS having respective output connections and respective first and second input connections;

means connecting the first input connection of the third modulo two ADDER to the output connection of the second delay element;

means connecting the input and output connection of the fifth delay element respectively to the output connection of the fourth delay element and the first input connection of the fourth modulo two ADDER;

means interconnecting the output connection of the fourth modulo two adder with the input connection of the sixth delay element;

means having first and second output connections respectively connected to the second input connection of the third and fourth modulo two ADDERS, having an input connection at the output connection of the second modulo two ADDER and characterized by generating an error correction signal on its first output connection whenever said second modulo two ADDER outputs two pulses separated by a delay time equal to the signal delay of the second delay elements, and generates an error correction signal on its second output connection delayed by a time equivalent to the delay generated by said fourth delay element after two error pulses separated by a time equivalent to the delay time of said fourth delay element are generated at the output connection of said second modulo two ADDER.

10. The apparatus set forth in claim 9 wherein the first, second, third and fourth delay elements produce signal delays of five, two, three and one units respectively and a unit is an arbitrary whole number greater than the number of digital signal bits in a signal sequence.

11. The apparatus set fourth in claim 6 wherein the decoder comprises a convolutional code decoder.

12. The apparatus set fourth in claim 6 wherein the decoder comprises:

an input and an output terminal;

first, second, third and fourth signal delay elements of unequal length, said delay elements each having respective input and output connections, said first and second signal delay elements being in serial connection and said third and fourth delay elements being in serial connection;

a first modulo two ADDER having an output connection, and having respective input connections connected to the output connections of said first, second, third and fourth delay elements;

a second modulo two ADDER having a first input connected to the output connection of said first modulo two ADDER and having a second input connection;

means for commutating the connection between the input terminal and the first delay element input connection, the third delay element input connection and the second input connection of said second modulo two ADDER, a fifth delay element having delay equal to said fourth signal delay element, and having respective input and output connections;

third and fourth modulo two ADDERS having respective output connections and respective first and second input connections;

means connecting the first input connection of the third modulo two ADDER to the output connection of the second delay element;

means connecting the input and output connection of the fifth delay element respectively to the output connection of the fourth delay element and the first input connection of the fourth modulo two ADDER;

means interconnecting the output connection of the fourth modulo two ADDER with the input connection of the sixth delay element;

means having first and second output connections respectively connected to the second input connection of the third and fourth modulo two ADDERS, having an input connection at the output connection of the second modulo two ADDER and characterized by generating an error correction signal on its first output connection whenever said second modulo two ADDER outputs two pulses separated by a delay time equal to the signal delay of the second delay elements, and generates an error correction signal on its second output connecton delayed by a time equivalent to the delay generated by said fourth delay element after two error pulses separated by a time equivalent to the delay time of said fourth delay element are generated at the output connection of said second modulo two ADDER.

* * * * *